United States Patent Office

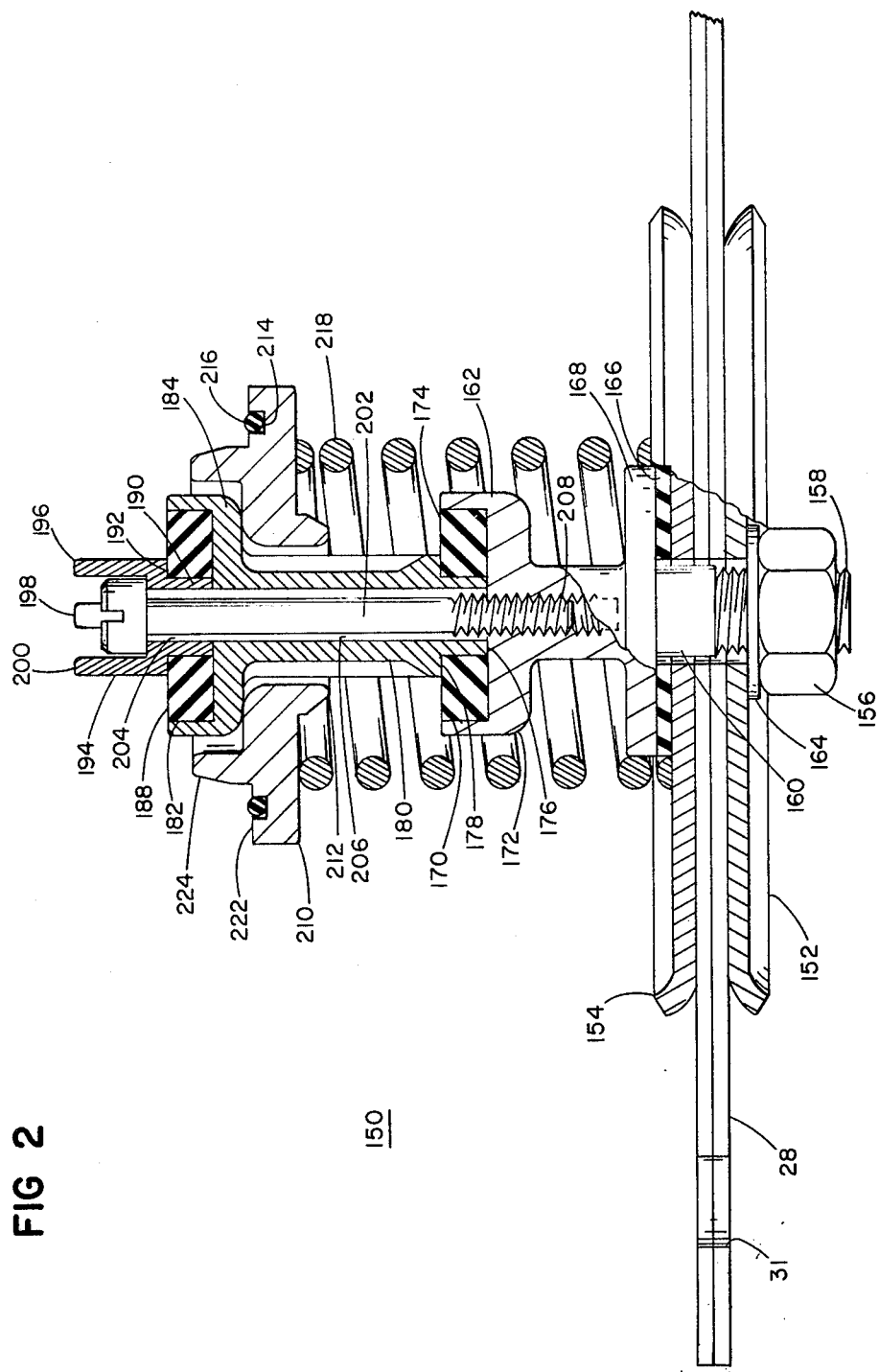

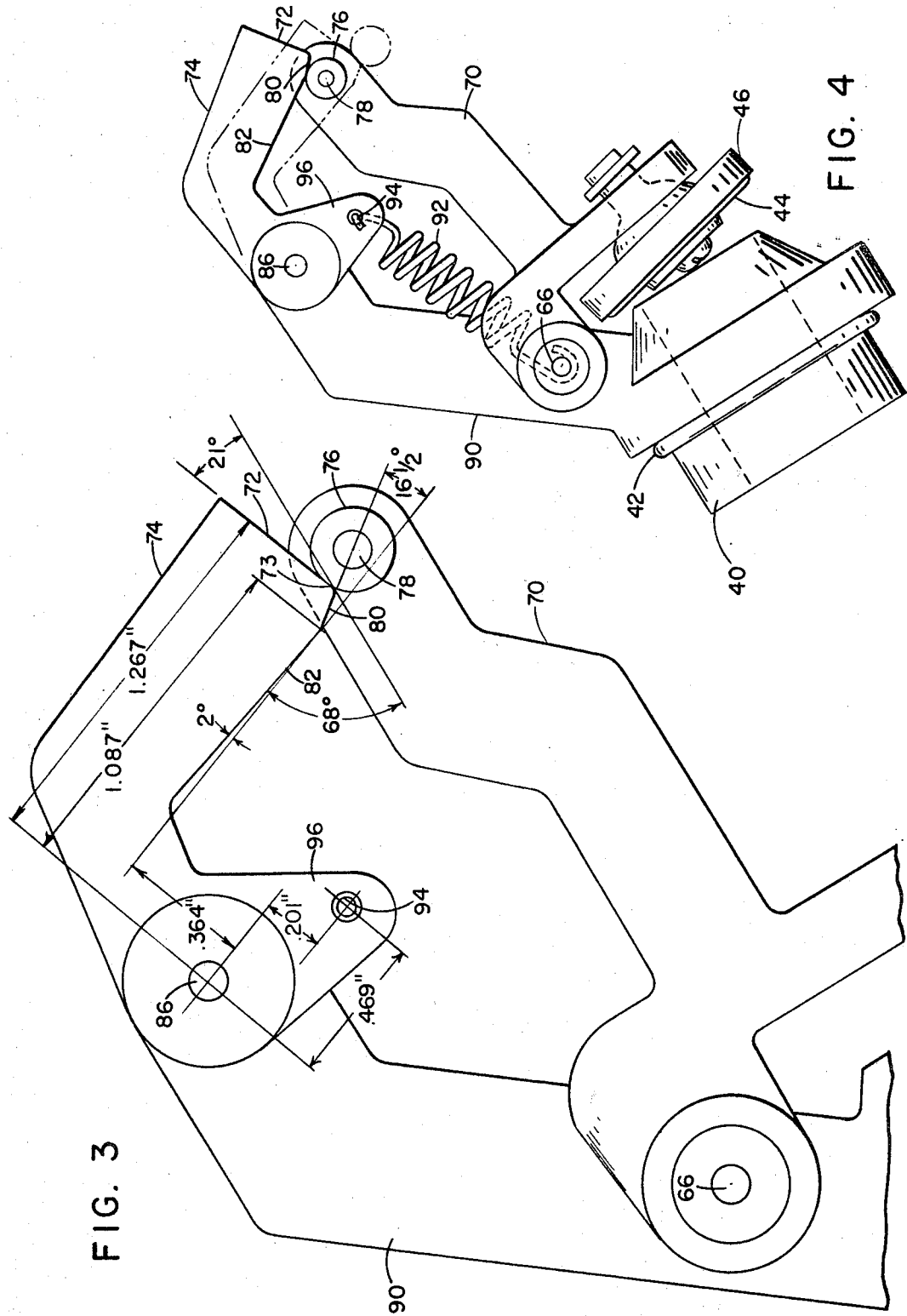

3,478,778
Patented Nov. 18, 1969

3,478,778
CLAPPER VALVE WITH CHANGING BIAS
Alan Clarkson Curtiss, Wellesley Hills, and Roger
Williams Hood, North Attleboro, Mass., assignors
to Hersey-Sparling Meter Company, Dedham,
Mass., a corporation of Massachusetts
Filed May 25, 1967, Ser. No. 641,337
Int. Cl. F16k 15/00, 17/00, 21/00
U.S. Cl. 137—527.4                                15 Claims

ABSTRACT OF THE DISCLOSURE

Check valve in which clapper is urged to close by a spring biased pivoted cam having a cam surface with first and second portions oriented so that, after the initial valve opening, the effectiveness with which the force of fluid against the clapper is transmitted through the cam to oppose the spring force is sharply increased. A roller in the pivoted clapper assembly cooperates with the cam surface.

---

Figure 1:
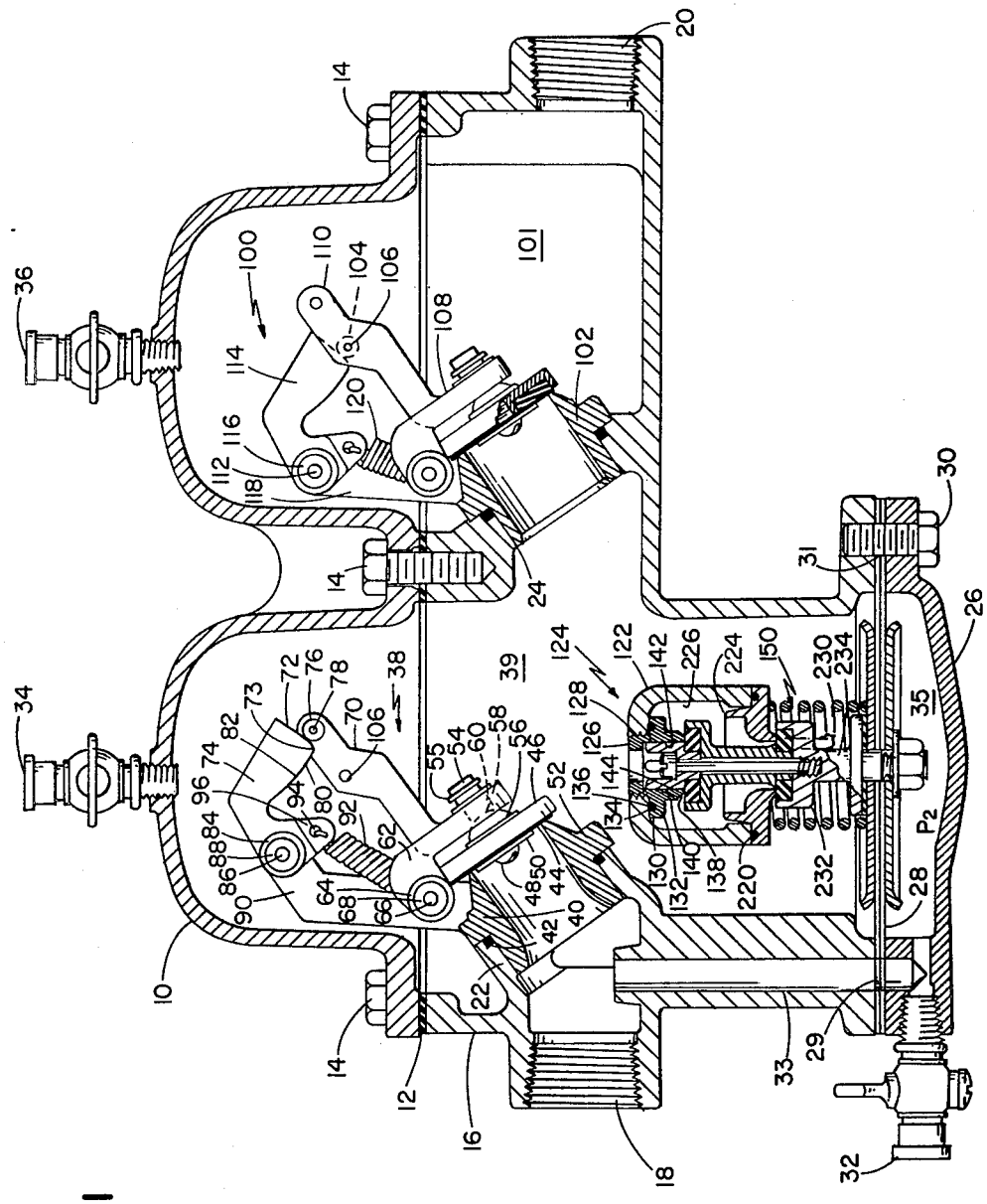

This invention relates to check valves for preventing fluid backflow.

Objects of the invention include providing a check valve that, once open, will move to increasingly open positions without significant increase in the fluid pressure differential across the valve; can be easily adapted for various relationships between flow rate and pressure loss across the valve; can be made and tested as a self-contained unit; will maintain a desired pressure differential even after extended mechanical wear; and is simple, reliable, easily maintained, and inexpensive.

Other valves have been designed with a view toward reducing the force required to further open a valve relative to that required for its initial opening. Examples are Farrow, 3,074,429 and Tilden 1,725,428, each of which employs a pivoted counterweight which quickly approaches a position aligned with its pivot whereby the effective force with which the clapper is urged to close rapidly drops off.

The present invention features a clapper urged to close by a spring biased pivoted cam having a cam surface with first and second portions oriented so that, after the initial valve opening, the effectiveness with which the force of fluid against the clapper is transmitted through the cam to oppose the spring force is sharply increased. In preferred embodiments the cam surface portions are separated by a rate of change of degree of curvature greater than that characteristic of the first and second portions so that a roller in the pivotally mounted clapper assembly acts, when the valve is closed, against the first portion through a short moment arm about the cam pivot and, when the valve increasingly opens, against an area of the second portion adjacent the first portion through a longer moment arm; the roller approaches the cam pivot axis as the valve opens; the longer moment arm is at least twice (and preferably three times) as long as long as the shorter moment arm; the roller is mounted for rotation on a roller support arm in one of a pair of apertures spaced by different amounts from the clapper assembly pivot axis; the first and second cam surface portions form an interior angle of 106½ degrees, and a third cam surface portion is located adjacent the second cam surface portion to cooperate with the roller in its most widely open positions; the first cam surface portion is oriented at an acute angle to the plane of the clapper assembly and roller axes; the roller is spaced from the plane of the clapper assembly and cam element axes when the valve is closed, and the spring engages the cam element at a point spaced by a lesser amount from that plane in the direction of the roller; and the roller acts against the third cam surface portion through moment arms about the cam element axis that are shorter than those associated with the second cam surface portion.

Other objects, features, and advantages will appear from the following description of a preferred embodiment of the invention, taken together with the attached drawings thereof, in which:

FIG. 1 is a view in vertical section of a valve system employing two check valves of the invention;
FIG. 2 is a view in vertical section of a relief valve;
FIG. 3 is an enlarged view of the check valve cam; and
FIG. 4 is a view similar to a portion of FIG. 1 showing a check valve in an open position.

There is shown in FIG. 1 top case 10 mounted with gasket 12 by bolts 14 to bottom case 16, which contains an inlet port 18, outlet port 20 and two check valve throats 22 and 24. Diaphragm cover 26 mounts diaphragm 28, and the entire sub-assembly, FIG. 2, by means of bolts 30, only one of which is shown, and completes the closure of bottom case 16. Diaphragm 28 has apertures 31, only one of which is shown, for receiving bolts 30, and an aperture 29 aligned with passage 33 which communicates inlet pressure to diaphragm 28 in chamber 35. Normally closed cocks 32, 34, and 36 are used for draining and testing purposes.

Check valve assembly 38 in compartment 39 includes check valve seat 40 fastened in throat 22 against seal ring 42 and engaging rubber face 44 fastened to clapper 46 by screw 48 and washer 50. Seat 40 is secured in position by bolts passing through bores, neither of which are shown, in flange 52. Shaft 54 secured by snap ring 55 and having hemispherical base 56 fastened to clapper 46, mates with enlarged hemispherical recess 58 and bore 60 in arm 62 to form a self-leveling mounting for clapper 46. Cylindrical bearing 64 pivotable about shaft 66 on rubber bushing 68, supports arm 62 and roller carrier arm 70, which engages the cam surface of cam 74 by means of rubber roller 76 rotatably mounted on shaft 78.

Cam 74 is mounted on cylindrical bearing 84 in turn rotatably mounted on shaft 86 in rubber bushing 88. Shafts 86 and 66 are mounted in suport arm 90 formed integrally with flange 52. Spring 92, secured to shaft 66 and engaged with aperture 94 in detent 96, urges cam 74 to move clockwise and bear on roller 76.

Cam 74 (FIG. 3) has cam surface portion 72 oriented, when the check valve is closed, at an angle of 21 degrees in the counter clockwise direction to the plane defined by the parallel axes of shafts 66 and 78. Cam surface portion 80 forms an interior angle of 106½ degrees with portion 72, and is separated therefrom by a curved portion 73 of 0.05 inch radius. Cam surface portion 82 is a continuation of portion 80 and forms an interior angle of 161½ degrees therewith.

The axis of shaft 86 is spaced 1.267 inches from the plane of surface portion 72, and the line of transition between portions 80 and 82 is spaced 0.18 inch above that plane. Other angles and dimensions are indicated in FIG. 3.

Check valve assembly 100 mounted in throat 24 in compartment 101 is similar to check valve assembly 38 with the exceptions that: the internal surface of check valve seat 102 differs slightly from that of check valve seat 40; roller 104 is mounted in aperture 106 closer to shaft 66 on roller carrier arm 110 (identical to arm 70); shaft 112 pivotally supporting cam 114 (identical to cam 74) on rubber bushing 116 is mounted closer to valve seat 102 on support arm 118; spring 120 is smaller than spring 92. These differences follow from the reduced pressure and flow characteristics of the fluid flowing through throat 24.

Housing 122 of relief valve 124 integrally connected with bottom case 16 threadably receives valve neat ring 126 in bore 128. Flange 130 of valve seat ring 126 contains channel 132 for retaining seal ring 134 in engagement with inner bearing surface 136 of housing 122. Sealing edge 138 is formed at the junction of the outer wall 140 and inner wall 142 which defines bore 144 in valve seat ring 126.

Subassembly 150, FIG. 2, includes diaphragm plates 152 and 154 mounted on opposite sides of diaphragm 28 by means of nut 156 threadably engaged with shaft 158 on cylindrical extension 160 of valve stem 162. Metal washer 164 is used between plate 152 and nut 156 and rubber washer 166 is used between plate 154 and the lower face of flange 168 of valve stem 162. Bore 170 in enlarged section 172 of valve stem 162 retains annular resilient valve seat 174, a neoprene composition having a durometer rating of 65.0±0.5. Cylindrical extension 176 and shoulder 178 of inner valve stem 180 position resilient valve seat 174 in bore 170.

Bore 182 in enlarged section 184 of inner valve stem 180 retains a second annular resilient valve seat 188, having the same construction and composition as seat 174. Cylindrical extension 190, and shoulder 192 of seat guide 194, position resilient valve seat 188 in bore 182. Guide 194 has three fingers 196, 198, and 200 which slidably engage bore 144, FIG. 1. Bolt 202 passing through bore 204 in guide 194 and bore 206 in inner valve stem 180, threadably engages bore 208 in valve stem 162 to unitize these elements.

Valve seat ring 210 having sealing edge 212 and channel 214 for retaining seal ring 216, and mounted for axial movement along inner valve stem 180 between sections 172 and 184, is urged toward section 184 by spring 218, bearing on diaphragm plate 154. Seal ring 216 is a neoprene composition having a durometer rating of 65.0±0.5. Channel 214 is 0.139 inch wide and 0.077 inch deep, while seal ring 216 has a cross-section diameter of 3/32 inch. Spring 218 uses 0.130 diameter wire wound in 6.5 coils, 4.5 of which are active, having a mean diameter of 1.375 inch to provide a spring rate of 31 pounds per inch. It compresses seal ring 216 against sealing face 220, FIG. 1, on housing 122 to bring sealing face 222 of valve seat ring 210 within approximately 0.02 inch of sealing face 220 when subassembly 150 is installed in housing 122.

Installation of subassembly 150 is accomplished by positioning diaphragm 28 on diaphragm cover 26, aligning apertures 31 with bolts 30, then threading bolts 30 into bottom case 16. The length of bolts 30 is such that spring 218 presents negligible opposition at initial engagement of bolts 30, full compression of spring 218 taking place when bolts 30 are securely engaged.

Reception of guide 194 in bore 144 is facilitated by the action of diaphragm plates 152, 154 which maintain valve stems 162 and 180 substantially perpendicular to the plane of diaphragm 28, and by the centering action of tapered lip 224 on valve seat ring 210. As bolts 30 are engaged and advanced spring 218 forces seal ring 216, carried by valve seat ring 210, against sealing face 220 of housing 122, forming within housing 122 a chamber 226, which communicates with external atmospheric pressure through a passage, not shown, in bottom case 16. Advancing bolts 30 draws diaphragm 28 toward housing 122 against the pressure of spring 218, and drives resilient valve seats 174 and 188 against sealing edges 212 and 138, respectively, closing chamber 226. Thus, dimensional differences in the members of the relief valve, which prevent simultaneous meeting of valve seats 174 and 188 with their respective sealing edges 212 and 138, are accomodated by the floating action of valve seat ring 210 and seal ring 216, with only a small force required to insure proper sealing contact. The need for only a small force to insure sealing contact reduces the force on diaphragm 28.

In operation a fluid pressure at inlet port 18 encounters face 44 of check valve 38 and diaphragm 28 on relief valve 124 in chamber 35. When the inlet pressure approaches a value of 8 p.s.i. greater than the pressure within compartment 39, the force with which roller 76 acts against cam surface portion 72 becomes sufficient to move cam 74 counterclockwise against the force of spring 92. At approximately 8 p.s.i. pressure differential roller 76, moving cuonterclockwise (approaching both shaft 86 and the plane of shafts 66 and 86), makes the transition along portion 73 from cam surface portion 72, to cam surface portion 80, where it acts (FIG. 4) with a moment arm about shaft 86 which is about three times as great as that with which it acted against portion 72. The differential pressure required to maintain valve 38 in intermediate or fully opened position is substantially the same as that required to perform the intial opening, 8 p.s.i., so that the pressure loss through valve 38 does not significantly increase with increased flow through it. Check valve 100 operates in the same manner as check valve 38 with the exception that it is opened when the pressure in compartment 39 approaches 3 p.s.i. greater than that in compartment 101 as dictated by the modified design of check valve 100. Calibration of valves 38 and 100 is achieved by varying the diameter of their respective rollers 76 and 104, as required by the cumulative effect of the manufacturing tolerances of the various parts. Relief valve 124 provides an additional safeguard against backflow, for when the pressure in compartment 39 approaches to within 5 p.s.i. of the pressure in chamber 35, the combined force of spring 218 and the pressure in compartment 39 drives diaphragm 28 away from valve seat ring 210, and draws valve seats 174 and 188 away from sealing edges 212 and 138, respectively. This action opens the valve, permitting the pressurized contents of compartment 39 to pass between fingers 196, 198, and 200, and between valve seat ring 210 and the inner valve stem 180, thereby escaping to the atmosphere through chamber 226. At a differential pressure of only 3 p.s.i. relief valve 124 is fully opened.

Relief valve 124 is a balanced valve: there are no axial forces tending to open or close the valve aside from the force exerted by diaphragm 28 in opposition to spring 218, despite water pressure variation. The unsealing force exerted by the pressurized fluid in compartment 39 on the area within the circumference of sealing edge 138 is offset by the sealing force exerted by the same fluid on annular area 230 on face 232 of enlarged section 172. Annular area 230 has an inner perimeter defined by the circumference of neck 234 of valve stem 162 and an outer perimeter defined by the circumference of sealing edge 212. The area within annular area 230 occupied by neck 234 does not contribute to these forces on the valve because neck 234 extends to diaphragm 28 and its cross-sectional area is not exposed to the fluid in compartment 39. The annular area external to annular area 230 on face 232 is equal to and oppositely directed relative to the annular area external to sealing edge 212 on valve seat 174; thus the combined axial force exerted by these areas is zero.

What is claimed is:
1. A check valve comprising
   a valve seat,
   a clapper assembly mounted for rotation about a first axis, said assembly including
      a clapper adapted to cooperate with said seat to close said valve,
      a roller support arms,
      a roller carrier by said arm for rotational movement relative thereto,
      said first axis being in the plane of said valve seat,
      a cam element mounted for rotation about a second axis, said cam element including
         a biasing arm and
         a cam surface,
            said cam surface including a first portion and a second portion, said cam surface having a rate of change of degree of curvature between said first and second portions, said rate being greater than any such rate of change of degree of curvature of said cam surface within said first or second portions, and a spring engaging said biasing arm to urge said cam element to rotate to close said valve, said spring applying a force to said biasing arm through a cam element closing bias moment arm about said second axis, said roller cooperating with said first portion when said valve is closed and with said second portion when said valve is in increasingly open positions, said roller being urged against said portions by water pressure tending to open said valve in opposition to said spring.

said roller applying spring-opposing forces to said first portion through first moment arms about said second axis, said first moment arms corresponding to successive positions of said roller along said first portion, said roller applying spring-opposing forces to said second portion through second moment arms about said second axis, said second moment arms corresponding to successive positions of said roller along said second portion, the second moment arm adjacent said first portion being greater than the first moment arm adjacent said second portion, whereby the effectiveness with which said water pressure opposes said spring increases as said roller moves from said first portion to said second portion.

2. The check wave valve of claim 1 wherein said second moment arm adjacent said first portion is at least twice as great as said first moment arm adjacent said second portion.

3. The check valve of claim 1 wherein said second moment arm adjacent said first portion is at least three times as great as said first moment arm adjacent said second portion.

4. The check valve of claim 1 wherein said roller approaches said second axis as said valve opens.

5. The check valve of claim 1 wherein said roller support arm has a pair of apertures spaced by different amounts from said first axis, said roller being mounted in one of said apertures.

6. The check valve of claim 1 wherein said first and second cam surface portions form an interior angle of 106½ degrees.

7. The check valve of claim 1 wherein the plane tangent to said roller where it contacts said first portion is oriented, when said valve is closed, at an acute angle to a plane defined by said first axis and the axis of said roller.

8. The check valve of claim 7 wherein said angle is 21 degrees.

9. The check valve of claim 1 wherein said first and second axes define a plane, and said roller is spaced from said plane when said valve is closed.

10. The check valve of claim 9 wherein said spring engages said biasing arm at a point spaced from said plane in the direction of said roller by an amount smaller than the spacing of said roller from said plane.

11. A check valve comprising a valve seat,
a clapper assembly mounted for rotation about a first axis, said assembly including
    a clapper adapted to cooperate with said seat to close said valve,
    a roller suppport arm,
    a roller carried by said arm for rotational movement relative thereto,
said first axis being in the plane of said valve seat,
a cam element mounted for rotation about a second axis, said cam element including
    a biasing arm and
    a cam surface,
        said cam surface including a first portion and a second portion, said cam surface having a rate of change of degree of curvature between said first and second portions, said rate being greater than any such rate of change of degree of curvature of said cam surface within said first or second portions, and
        a spring engaging said biasing arm to urge said cam element to rotate to close said valve,
        said spring applying a force to said biasing arm through a cam element closing bias moment arm about said second axis,
        said roller cooperating with said first portion when said valve is closed and with said second portion when said valve is in increasingly open positions, said roller being urged against said portions by water pressure tending to open said valve,
        said first and second axes defining a plane from which said roller is spaced when said valve is closed.

12. A check valve comprising
a valve seat,
a clapper assembly mounted for rotation about a first axis, said assembly including
    a clapper adapted to cooperate with said seat to close said valve,
    a roller support arm,
    a roller carried by said arm for rotational movement relative thereto,
said first axis being in the plane of said valve seat,
a cam element mounted for rotation about a second axis, said cam element including
    a biasing arm and
    a cam surface,
        said cam surface including a first portion and a second portion, said cam surface having a rate of change of degree of curvature between said first and second portions, said rate being greater than any such rate of change of degree of curvature of said cam surface within said first or second portions, and
        a spring engaging said biasing arm to urge said cam element to rotate to close said valve,
        said spring applying a force to said biasing arm through a cam element closing bias moment arm about said second axis,
        said roller cooperating with said first portion when said valve is closed and with said second portion when said valve is in increasingly open positions, said roller being urged against said portions by water pressure tending to open valve, the plane tangent to said roller where it contacts said first portion being oriented, when said valve is closed, at an acute angle to a plane defined by said first axis and the axis of said roller.

13. The check valve of claim 12 wherein said angle is 21 degrees.

14. The check valve of claim 12 wherein said cam element comprises a first portion, said second axis passing through one end thereof, a second portion extending transversely from said one end and having at its free end an aperture in which said spring is engaged, and a third portion longer than said second portion extending transversely from the other end of said first portion and having at its free end said first cam surface portion.

15. The check valve of claim 1 further including a third cam surface portion adjacent said second portion to cooperate with said roller in its most widely open positions, said roller acting against said third portion through moment arms about said second axis that are shorter than said second moment arms, said third portion being at an angle to said second portion.

References Cited

FOREIGN PATENTS 532,241  1/1941  Great Britain.

ALAN COHAN, Primary Examiner

H. J. COHN, Assistant Examiner

U.S. Cl. X.R.

137—530, 531